Dec. 22, 1925.

H. W. WAITS

UNIVERSAL JOINT

Filed Oct. 9, 1924

1,566,454

Inventor
H. W. Waits,
By Clarence A. O'Brien
Attorney

Patented Dec. 22, 1925.

1,566,454

UNITED STATES PATENT OFFICE.

HENRY W. WAITS, OF GAINESVILLE, FLORIDA.

UNIVERSAL JOINT.

Application filed October 9, 1924. Serial No. 742,574.

*To all whom it may concern:*

Be it known that I, HENRY W. WAITS, a citizen of the United States, residing at Gainesville, in the county of Alachua and State of Florida, have invented certain new and useful Improvements in a Universal Joint, of which the following is a specification.

This invention relates to improvements in universal joints for association with the adjacent ends of a drive shaft and driven shaft respectively.

One of the important objects of the present invention is to provide a universal joint of the above mentioned character, which is of such construction as to obviate the necessity of employing a series of bolts for securing the parts of the joint together.

A further object of the invention is to provide a universal joint of the above mentioned character, which may be readily and easily assembled, the same being simple in construction, inexpensive, strong and durable and furthermore adapted for the purposes for which it is designated.

Other objects and advantages of this invention will become apparent during the course of the following description.

In the accompanying drawing forming a part of this specification and in which like numerals designate like parts throughout the same:

Figure 1:
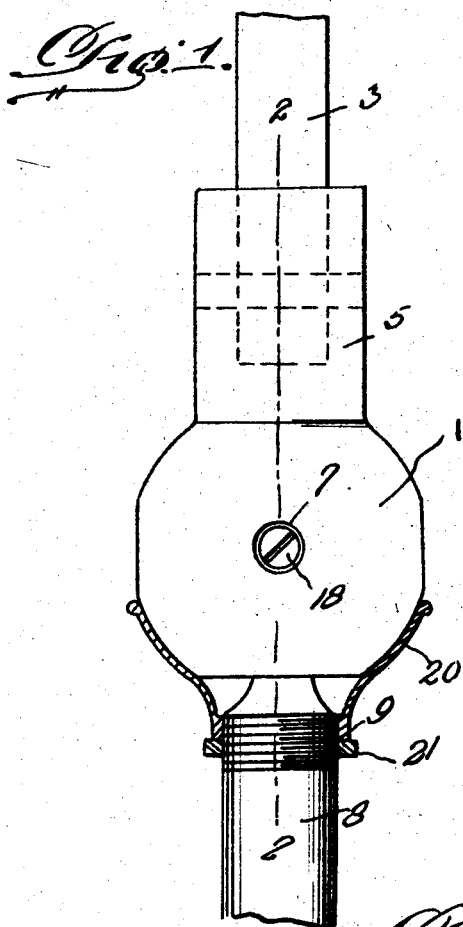
Figure 1 is a side elevation of the universal joint embodying my invention.

In the drawing wherein for the purpose of illustration is shown the preferred embodiment of my invention, the numeral 1 designates generally the socket member, the socket thereof being indicated at 2. The socket member is adapted to be secured on the end of the driven shaft 3 by means of the transversely extending pin 4 in the manner clearly illustrated in the drawing. It is, however, to be understood that any other suitable fastening means may be employed for securing the socket member on the end of the driven shaft. The socket member is provided with a tubular extension 5 for receiving the end of the driven shaft in the manner well known in the art. The socket member 1 is further provided with diametrically opposed threaded openings 6 and 7 respectively, the same communicating with the socket 2 and the purpose thereof will hereinafter be more fully described.

Adapted to be associated with the adjacent end of the drive shaft (not shown) in any well known manner, is the shank portion 8, the outer end thereof being threaded, as illustrated at 9 and terminating in the substantially flat head 10, the outer edge of which is rounded as illustrated at 11.

Adapted to be disposed within the annular groove or channel 2' formed in the socket 2 of the socket member 1 and cooperating with the opposed side faces of the flat head 10 are the complementary sections 12 and 13 respectively. The flat faces of the segmental sections abut the adjacent flat faces of the flat head 10 as is clearly illustrated in Figures 2 and 3 of the drawing, and in this manner a rocker is formed on the end of the shank 8.

Each of the segmental sections is provided with an opening 14 for registry with the transverse opening 15 arranged centrally in the flat head 10 for receiving the locking pin 16 which is inserted through either of the openings 6 or 7 provided in the socket member 1. The pin 16 is of a length equal to the diameter of the rocker formed by the complementary segmental sections and the flat head 10 formed on the outer end of the shank 8 as is clearly illustrated in Figures 2 and 3 of the drawing. In assembling the joint, the segmental sections are first disposed within the socket 2 and the flat head is then placed between the flat faces of the segmental sections and the locking pin 16 is inserted through the registering openings provided in the segmental sections and the flat head.

Figure 2:
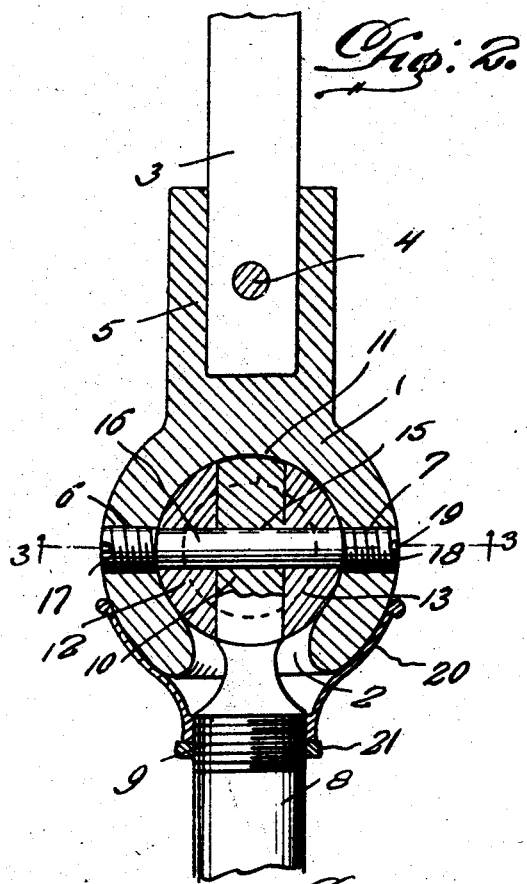
Figure 2 is a sectional view taken approximately on line 2—2 of Figure 1.
Figure 3:
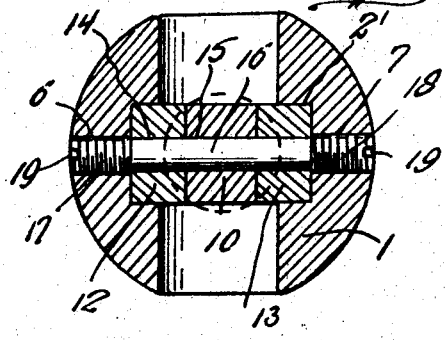
Figure 3 is a sectional view taken on line 3—3 of Figure 2.
Figure 4:
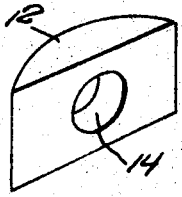
Figure 4 is a detail perspective view of one of the segmental sections.

For the purpose of preventing the displacement of the locking pin from engagement with the segmental sections and the flat head, the plugs 17 and 18 are threaded in the threaded openings 6 and 7 respectively as is also clearly illustrated in Figures 2 and 3.

The outer ends of the threaded plugs are slotted as illustrated at 19 for receiving a screw driver on the like in order to insert or remove the plugs from the respective threaded openings in the socket member.

A grease retaining cup 20 is threaded on the threaded end 9 of the shank portion 8 and is held thereon by the lock nut 21. As is clearly illustrated in Figure 2, the cup 20 extends around the open end of the socket member 1.

It will be seen from the foregoing description, that a universal joint has been provided which does not necessitate the employment of securing bolts such as are used with the universal joints now in use. The simplicity in which my improved universal joint is constructed enables the same to be readily assembled or disassembled and when secured to the adjacent ends of the drive shaft and driven shaft respectively, it will be positive and efficient in carrying out the purpose for which the same is designated.

While I have shown the preferred embodiment of my invention, it is to be understood that various changes in the size, shape and arrangement of parts may be resorted to without departing from the spirit of the invention and the scope of the appended claim.

Having thus described my invention, what I claim is:—

A universal joint comprising a socket member having a pair of oppositely disposed interior grooves, a shank member, a flat head formed on the outer end thereof, the outer edge of said head being rounded, complementary segmental sections disposed in said socket, each provided with a pair of parallel sides, a flat edge, and an arcuate edge, the arcuate edges being receivable in the grooves, said flat head being adapted to be inserted in said socket between the flat edges of the segmental sections to form a rocker movable in said sockets, said segmental sections and said flat head being provided with registering openings, said socket being provided with threaded openings registered with each other, said openings communicating with said grooves, a locking pin insertible through either of said threaded openings in the socket, and adapted to extend through the registering openings in the segmental sections and flat head, said locking pin being of a length equal to the diameter of the socket, and plugs threaded into the openings of the socket to prevent the displacement of said locking pin.

In testimony whereof I affix my signature.

HENRY W. WAITS.